United States Patent
Wright et al.

[15] 3,673,851
[45] July 4, 1972

[54] METER PROVING SYSTEM

[72] Inventors: Edward L. Wright, Plainfield; Eugene Meseck, Lincoln Park, both of N.J.

[73] Assignee: Customline Control Products, Inc., Linden, N.J.

[22] Filed: Aug. 18, 1970

[21] Appl. No.: 64,741

[52] U.S. Cl. ..................................................73/3, 73/194 R
[51] Int. Cl. .........................................................G01f 25/00
[58] Field of Search..............................................73/3, 194 R

[56] References Cited

UNITED STATES PATENTS

| | | | |
|---|---|---|---|
| 3,455,143 | 7/1969 | Shamp | 73/3 |
| 3,028,744 | 4/1962 | Bagwell | 73/3 |
| 3,250,113 | 5/1966 | Rush | 73/3 |

*Primary Examiner*—Louis R. Prince
*Assistant Examiner*—William A. Henry, II
*Attorney*—Lerner, David & Littenberg

[57] ABSTRACT

A system and method associated therewith are disclosed for proving and/or monitoring the accuracy of a flow measuring device situated in an active flow path and capable of providing an indication of the rate of flow of fluid therethrough. The system includes storage means for accumulating a predetermined volume of fluid therein and injection means cooperating with the storage means for introducing said predetermined volume of fluid into the active flow path on the upstream side of the flow measuring device within a measured period of time. In a preferred embodiment, the storage means is continually flushed with the product flowing in the active flow path thereby maintaining the temperature and product in the storage means coinincident with the temperature and product flowing in the active flow path. Additionally, fluid derived from the active flow path may be utilized for driving the injection means.

19 Claims, 1 Drawing Figure

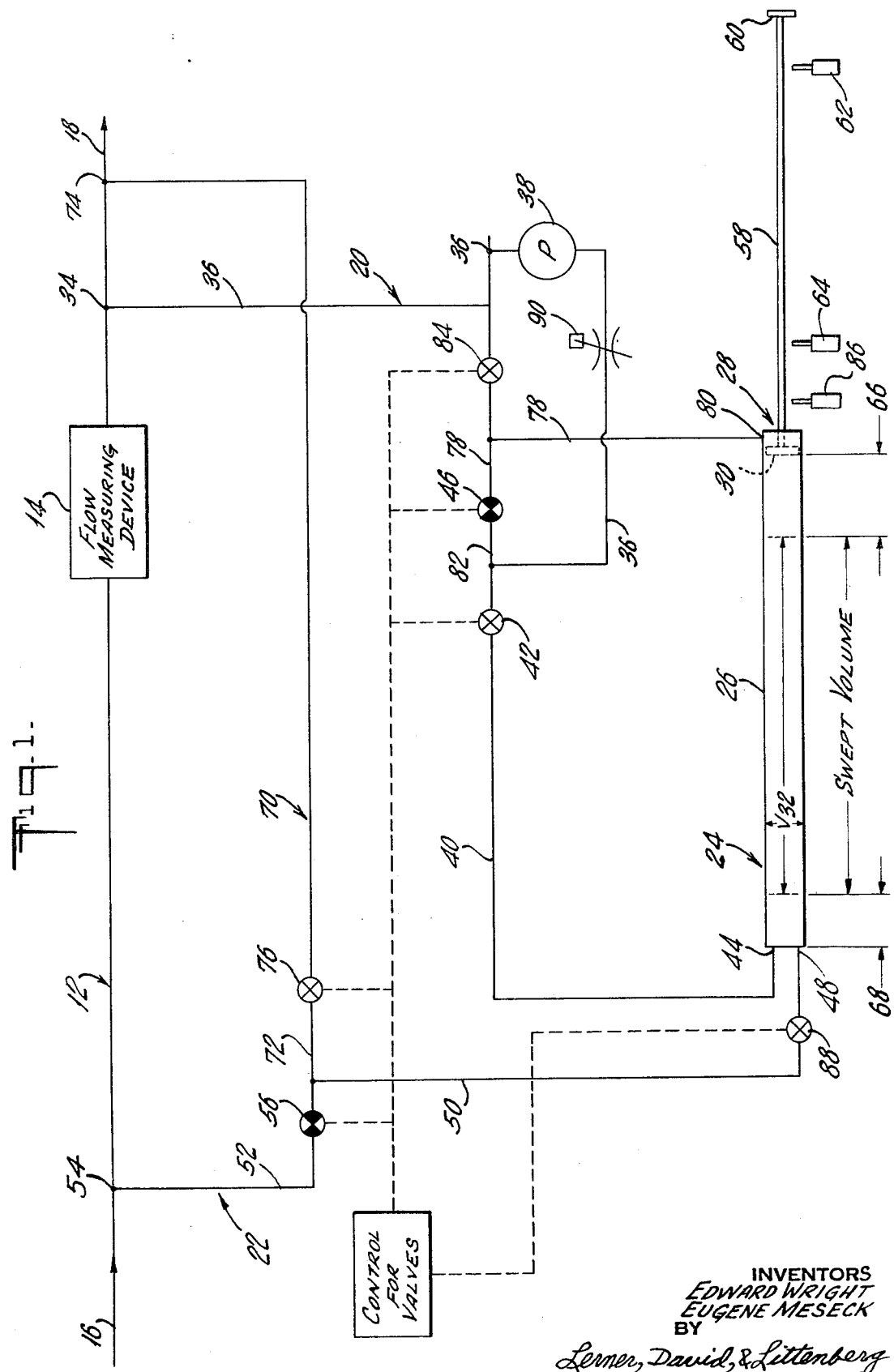

3,673,851

METER PROVING SYSTEM

FIELD OF THE INVENTION

This invention relates to a system for proving and/or monitoring a flow measuring device, more commonly known as a fluid meter, and more particularly to such a system which can prove and/or monitor the accuracy of such a flow measuring device while it is operated in an active flow path.

BACKGROUND OF THE INVENTION

In many flow systems it is desirable and indeed sometimes necessary to prove the accuracy of one or more of the fluid meters being utilized in the system to provide signals representative of the rate of flow of fluids therethrough. One such system where the accuracy of flow meters is especially critical may be found for example in U.S. Pat. application Ser. No. 64,736 entitled "Leak Detection System" filed Aug. 18, 1970 in the name of Edward L. Wright and Eugene Meseck and assigned to the assignee of the instant invention.

The primary prior art technique for proving a fluid meter may be found in U.S. Pat. No. 2,448,616 issued Sept. 7, 1948 to T. Oakley et al. In the Oakley system, a predetermined quantity of gas in injected into an empty pipe line having a meter. The meter reading is then taken to determine if the meter is reading accurately. It will be appreciated that although a system like that disclosed in the Oakley patent proves or disproves the accuracy of the meter at the particular test conditions, the conclusions derived from such testing procedure have no validity with respect to the accuracy of the flow meter over the various ranges of flow to which the meter will be exposed in actual service. In fact, it should be pointed out that manufacturers of flow meters recognize that their meters perform differently at different ranges of flow therethrough, and accordingly most manufacturers provide their customers with curves indicating meter characteristics at different rates of flow whereby the consumer can develop a "K" factor or error factor which should be utilized to correct the meter reading dependent upon the particular rate of flow the meter happens to be exposed to at the time of measurement. This problem is further bought out in U.S. Pat. No. 2,046,591 which specifically discloses that a meter which is calibrated in one portion of its curve will not necessarily read accurately in other protions of its curve.

Other patents such as U.S. Pat. No. 2,510,327 entitled "Testing Apparatus for Fluid Meters" and U.S. Pat. No. 3,308,660 entitled "High Percision Flow Meter" disclose other techniques for proving meters and are representative of other prior art techniques over which the instant invention is intended to be an improvement. In U.S. Pat. No. 2,510,327, again the meter is tested by either removing the fluid which was normally flowing therein or by testing dry, both techniques being equivalent for all practical purposes to the technique presented in the aforementioned Oakley patent. In U.S. Pat. No. 3,308,660, a meter is tested by introducing a disimilar material into the active flow path for calibration purposes. Since this system is relatively complex and expensive to administer, it has not enjoyed acceptance in the industry. Furthermore, in the system described in U.S. Pat. No. 3,308,660 the meter thereof is not a true flow measuring device in the sense that it cannot independently produce an output signal representative of fluid flow therethrough, but can only function to monitor fluid flow when the dissimilar material is introduced therethrough.

Thus prior to the instant invention, there existed no simple, inexpensive and reliable technique for proving the accuracy of a fluid meter disposed in and operating upon an active flow path.

SUMMARY OF THE INVENTION

As suggested above, the instant invention provides a proving system for a flow meter which is capable of proving the accuracy of the meter while it is situated in and operating upon an active flow path. Thus the meter proving system of the instant invention will provide an indication of the accuracy of the meter at the particular flow rate which is being detected at the time of proving. It will also be appreciated that by varying the flow rate in the active flow path in which the meter is situated, it is possible, utilizing the system of the instant invention to actually check the validity of the aforementioned manufacturers' curves. Moreover, the instant invention can be used to continually monitor a flow meter to provide accurate flow rate information or alternatively can be employed to periodically check the validity of flow rate information to determine an updated instrumentation error factor which can be employed for example in the leak detection system of the aforementioned patent application to Edward L. Wright et al.

Broadly speaking and in combination with a flow measuring device situated in an active flow path and capable of providing an indication of the rate of flow of fluid therethrough; the meter proving or calibration system of the instant invention comprises storage means for accumulating a predetermined volume of fluid and injection means cooperating with the storage means for introducing the predetermined volume of fluid into the active flow path on the upstream side of the flow measuring device within a measured period of time. By sampling the flow for a period of time prior to the introduction of the predetermined volume of fluid and then sampling the flow measuring device during the measured period of time that the additional predetermined volume of fluid is being introduced into the flow path, it is possible to determine the actual flow rate in the active flow path.

Preferably a bypass fluid circuit is established which includes a first fluid path communicating at one and thereof with the active flow path on the downstream side of the flow measuring device and at its opposite end with the storage means, and a second fluid path communicating at one end thereof with the storage means and at the other end thereof with the active flow path on the upstream side of the flow measuring device. Thus the fluid bypass circuit establishes a technique for not only introducing the predetermined volume of fluid into the upstream side of the active flow path, but additionally provides a path by which the fluid accumulated in the storage means can be "tapped" from the downstream side of the active flow path. In this manner the fluid bypass circuit and the storage means disposed therein provides a simple method of accumulating and injecting a predetermined volume of fluid into the active flow path and moreover guarantees that the fluid being injected is exactly the same fluid as that flowing in the active flow path.

As a particularly advantageous feature of the instant invention a "flushing" bypass flow path is provided which communicates at one end thereof with the active flow path on the downstream side of the flow measuring device and is selectively communicable at its other end with the storage means. In the practice of the invention, at all times prior to and after a calibration operation; by virtue of the flushing bypass flow path, the storage means will be continually flushed with the fluid flowing in the active flow path thus guaranteeing not only the instantaneous similarity of the injected fluid to the fluid in the active flow path but also guaranteeing the identity of temperature of these two fluids.

As a further preferred embodiment of the instant invention, and as will be explained in greater detail, the actuating means employed to inject the predetermined volume of fluid accumulated in the storage means into the active flow path is operated by fluid derived from the downstream side of the active flow path. This provides an extremely simple technique for operating the injection means of the system.

Finally, as a further feature, means are provided to vary the measured period of time during which the additional predetermined volume of fluid will be introduced into the active flow path thereby permitting one to vary the incremental flow rate in the active flow path attributable to the additional volume introduced therein. Preferably, the increased flow rate attributable to the injected volume is maintained as small as possible with respect to the flow rate in the active flow path, most desirably in a range of a 1 to 5 percent increase in flow rate, such that the information derived from the flow measuring device will in fact be as closely related as possible to the actual flow rate in the active flow path.

Accordingly, it is an object of the instant invention to provide a meter proving system capable of proving the meter at actual operating flow rates.

Another object of the instant invention is to provide such a meter proving system which employs storage means for accumulating a predetermined volume of fluid therein, and injection means for introducing said predetermined volume of fluid into the active flow path on the upstream side of the flow measuring device within a measured period of time.

Another object of the instant invention is to provide such a meter proving system which includes a flushing bypass circuit to continually flush the aforementioned storage means with the product flowing in the active flow path.

Another object of the instant invention is to provide such a meter proving system wherein the injection means for introducing a predetermined volume of fluid into the active flow path is operated by fluid derived from the downstream side of the flow measuring device.

Yet another object of the instant invention is to provide such a meter proving system wherein the incremental increase in flow rate in the active flow path attributable to the predetermined volume accumulated in the aforementioned storage means is made as small as possible preferably in the range of 1 to 5 percent of the active flow rate.

These and other objects of the instant invention will be had by referring to the following specification and drawing in which:

FIG. 1 illustrates a meter proving system of the instant invention.

Turning to the Figure, there is shown a fluid flow path 12 in which is situated a flow measuring device or meter 14 capable of providing an indication of the rate of flow of fluid through the flow path 12 from an input 16 to an output 18 thereof. The flow path 12 can be a conduit or pipe of any type and could be carrying any fluid, gas or liquid. In like manner, the flow measuring device 14 might be any commercially available meter providing output signals, analog or digital, indicative of the rate of flow of fluid through the flow path 12. Although in no way intended to be limited thereby, it might be pointed out that the particular flow measuring device 14 employed in the instant system is a meter device of the digital type providing as an output 3,000 pulses per barrel of product flowing through the path 12. Also, since the flow path 12 is carrying fluid, and indeed the meter proving system of the instant invention is intended to be employed for testing the accuracy of the device 14 while the flow path 12 is carrying fluid, the path 12 will hereinafter be referred to as an "active" flow path.

Disposed in parallel about the flow measuring device is a fluid bypass circuit comprising a first fluid path broadly designated 20 and a second fluid path broadly designated 22. As will be explained in greater detail, storage means 24, preferably in the form of an elongated cylinder 26, is disposed in the fluid bypass circuit, and injection means 28, preferably in the form of a longitudinally displaceable piston 30, is provided for introducing a predetermined volume of fluid 32 accumulated in the storage means 24 into the upstream side of the active flow path 12 within a measured period of time.

The first flow path 20 is employed to divert fluid from the downstream side of the flow measuring device 14 to the storage means 24 for the accumulation of the predetermined volume V 32. To that end the first fluid path 20 is connected at one end 34 thereof to the flow path 12 on the downstream side of the flow measuring device 14, and includes, for ease of identification, the following sections of conduit: the section 36 including a pump 38 therein to aid in withdrawing the fluid from the line 12, and the section 40 including a normally open valve 42 therein. Thus the opposite end 44 of the first fluid path 20 is connected as an input to the storage means 24 and may be said to be selectively communicable with the storage means 24 by virtue of the valve 42. It might be pointed out at this time, that a normally closed valve 46 dictates that the fluid in segment 36 pass to the segment 40.

As noted above, the second fluid path 22 provides the path by which the accumulated volume V 32 in the storage means 24 may be injected into the upstream side of the flow path 12. To that end, one end 48 of the second fluid path 22 is connected to the storage means 24, and the fluid path 22 includes segments 50 and 52 whereby the opposite end 54 of the second fluid path 22 may be selectively connectable to the flow path 12 on the upstream side of the flow measuring device 14 by virtue of operation of a normally closed valve 56.

To complete the description of the basis apparatus necessary to practice the instant invention, it should be pointed out that secured to the piston 30 is a piston rod 58 carrying a switch actuating member 60 at its opposite end. As the piston 30 sweeps the entire volume of the cylinder 26, (by actuating means to be described in greater detail), the time required to inject the smaller predetermined volume of the fluid V 32 into the flow path 12 will be accurately measured by the sequential energization of switches 62 and 64 by the actuating member 60. Switches 62 and 64 might be simple mechanical limit switches or alternatively might comprise magnetically operable reed switches actuated in response to the passing of the actuating member 60 constructed of suitable magnetic material. A pretravel distance 66 and an overtravel distance 68 are provided within the storage means 24 to guarantee that the piston 30 travels at a constant rate of speed during the time that it sweeps the predetermined volume V 32.

With the apparatus thus far described, the accuracy of the meter 14 can be proven. Specifically, to determine actual flow rate through the flow measuring device 14, it is only necessary to take the follow steps and perform the following calculations. First the meter 14 is sampled over a predetermined time interval, for example 10 seconds, to determine the active flow (nominal) in pulses per unit time. This may be designated P/unit $t$. Then the normally closed valve 56 is opened and by actuating means to be described in greater detail, the piston 30 is caused to sweep the volume of fluid which has been accumulated in the cylinder 26. As the actuating member 60 sequentially passes the switches 62 and 64, the time between the energization of these two switches will provide an exactly measured interval of time (T) during which the predetermined volume (V) 32 is injected into the upstream side of the active flow path. During this time interval (T), the flow measuring device 14 is again sampled to provide an indication of the number of pulses produced during the interval (T) while both main stream flow and the additional flow due to the volume V 32 are passing through the flow measuring device 14. This may be designated $P_{(t/+1)/T}$ or X'. Finally, knowing now the interval of time T, the previous sampling of the meter (taken before the injection of the additional volume) which produced pulses per unit time can be converted to pulses per interval of time (T) simply by multiplying;

$$P/\text{unit } t \times (T) \text{ to produce } X$$

which represents mainstream flow in pulses per predetermined interval of time T. If one substracts X from X' he then knows the number of pulses produced by the meter 14, which were were attributable to the predetermined volume V 32. This information provides a factor:

$$V32/(X'-X)$$

which says that the meter is passing a certain volume per pulse which factor can then be multiplied by X (total pulses over the interval T to provide an indication of the actual flow rate in the meter, the desired result. If desired, the quantity X, representing pulses /T may be derived by taking two samplings of the meter 14, one before the injection and one after the injection, and the results averaged.

To guarantee the instantaneous coincidence of the fluid in the storage means 24 to the fluid in the active flow path 12 and the coincidence of the temperature of these two fluids, a flushing bypass flow path 70 is provided and communicates at one end 72 thereof with the storage means 24 (through the segment 50 of the second fluid path 22) and at the other end 74 thereof with the downstream side of the active flow path 12. A normally open valve 76 is provided in the flushing bypass flow path 70. In operation, whenever the system is stable (i.e., the volume 32 is not being injected into the upstream side of the flow path 12), the normally closed valve 56 remains closed while the normally open valve 76 remains open. In this manner, fluid is continually being drawn from the downstream side of the flow measuring device 14 (through the first fluid path 20), flushed through the storage means 24, through the flushing bypass flow path 70, and back to the downstream side of the active flow path 12. Thus at the instant the calibration cycle is to begin (and the valve 56 is to be opened and the valve 76 closed), the sample of fluid in the storage means will be the most recent specimen, in both properties and temperature, of the fluid flowing in the active flow path 12.

As noted previously, the system of the instant invention further contemplates that the fluid flowing in the active flow path may be utilized as the actuating driving means for the injection means 28. To this end, there is provided an actuating bypass fluid circuit 78 communicating at one end 80 thereof with the cylinder 26 on the right hand side of the piston 30 and at the other end 82 thereof with the downstream side of the active flow path (through the segment 36 of the aforementioned first fluid path 20). When it is desired to drive the injection means 28, the normally open valve 42 is closed, the normally closed valve 46 is opened, and a normally open valve 84 is closed to divert the fluid from the downstream side of the active flow path 12 through the actuating bypass fluid circuit 78 to displace and drive the piston 30. Of course, while the piston is being driven, the aforementioned normally open flushing valve 76 is closed and the normally closed valve 56 is opened to allow the fluid stored in the storage means 24 to be injected into the active flow path 12 as previously described.

After the calibration cycle is completed, a third switch 86 is tripped by the actuating member 60 to close valve 46 and open valve 42 to permit fluid to re-enter the storage means 24 from the point 44 and drive the piston 30 rearwardly toward the position illustrated in the Figure. Simultaneously, the normally open valve 84 is permitted to revert to its normally open condition to provide a bleed off path through segments 78 and 36 back to the downstream side of the active flow path 12. Also, it will be appreciated that a normally open valve 88 is maintained closed at this time to prevent the fluid being used to drive the piston 30 back to its starting position from entering the second fluid path 22.

Finally, from the above discussion, it will be appreciated that the time interval which is required to inject the volume V 32 into the upstream side of the active flow path 12 will determine the incremental flow rate ($V_{32/T}$) which is being added to the flow rate normally carried in the active flow path 12. Since it is a feature of the instant invention that the system hereof can accurately determine or test for flow rates at the actual operating point of the flow measuring device being tested, it is extremely desirable that the additional flow rate added to the active line be maintained as small as possible. To that end, a selectively adjustable valve 90 is located on the output side of the pump 38 to allow one to selectively vary the actuating pressure being applied to the rear of the piston 30 through the actuating bypass fluid path 78. Should the flow path 12 be carrying fluid at a relatively high flow rate, then the added flow rate attributable to the fluid in the volume 24 will have relatively little effect on changing the actual flow rate in the active flow path 12. In that case, the selectively operable valve 90 may be employed in such a manner as to increase the speed of travel of the piston 30. On the other hand, with low flow rates in the active flow path 12, a significantly large additional flow rate due to the volume in the storage means 24 might significantly change the operating point of the flow measuring device. In that situation, the valve 90 would be restricted to produce a relatively slow displacement of the piston 30. Preferably, the valve 90 is employed in the aforedescribed manner such that the incremental flow rate added to the line 12 by virtue of the volume in the storage means 24 will be as small as possible preferably in the range of 1 to 5 percent of the actual flow rate in the flow path 12. In this manner, the meter 14 will indeed be tested at as close as possible to its actual operating point. Also, it should be pointed out that if desired, the adjustable valve 90 could be a servo-type mechanism automatically functioning in response to increases and decrease in flow rate of the active line 12.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

We claim:

1. In combination with a flow measuring device situated in an active flow path and capable of providing an indication of the rate of flow of fluid therethrough; a calibration system for proving said flow measuring device, said system comprising:

storage means for accumulating a predetermined volume of fluid therein;

injection means cooperating with said storage means for introducing said predetermined volume of fluid into said active flow path on the upstream side of said flow measuiring device within a measured period of time;

wherein the fluid stored in said storage means is the same fluid flowing in said fluid path.

2. In the combination of claim 1 and further including a fluid bypass circuit including;

a first fluid path communicating at one end thereof with said active flow path on the downstream side of said flow measuring device and selectively connectable at its opposite end thereof to said storage means; and a second fluid path communicating at one end thereof with said storage means and selectively connectable at its opposite end thereof to said active flow path on the upstream side of said flow measuring device.

3. In the combination of claim 2 and further including pumping means for aiding in the flow of fluid from said active flow path through said fluid bypass circuit and said storage means disposed therein.

4. In the combination of claim 2 and further including a flushing bypass flow path communicating at one end with said active flow path on the downstream side of said flow measuring device and selectively communicable at its other end with said storage means;

whereby said storage means can be continually flushed with said fluid prior to the time that the fluid in said storage means is introduced into said active flow path by said second fluid path.

5. In the combination of claim 4 wherein said other end of said flushing bypass flow path is selectively communicable with said storage means by being selectively connectable to said second fluid path at a point intermediate said storage means and said active flow path.

6. In the combination of claim 5 wherein said injection means comprises fluid displacing means operable within said storage means for displacing fluid out of said storage means; and further including selectively operable actuating means for operating said fluid displacing means.

7. In the combination of claim 6 and further including an actuating bypass fluid circuit communicating at one end thereof with said storage means in operative relationship to said fluid displacing means and selectively communicable at its other end thereof to said downstream side of said active flow path.

8. In the combination of claim 7 wherein said other end of said actuating bypass fluid circuit is selectively communicable with said downstream side of said active flow path by being selectively connectable to said first fluid path at a point intermediate said storage means and said active flow path.

9. In the combination of claim 8 and further including pumping means disposed in said first fluid path.

10. In the combination of claim 7 wherein said storage means comprises an elongated cylinder having an internal volume greater than said predetermined volume;

said fluid displacing means comprises a piston longitudinally movable in said cylinder in response to the flow of fluid into said storage means from said actuating bypass fluid circuit; and further including control means responsive to the movement of said piston for establishing said measured period of time within which said predetermined volume of fluid will be introduced into the upstream side of said active flow path.

11. In the combination of claim 7 wherein said actuating bypass fluid circuit includes control valve means therein for preselectively varying the time required for said fluid displacing means to displace said predetermined volume; whereby said measured period of time can be preselectively varied to vary the increased flow rate in said active flow path attributable to said predetermined volume of fluid.

12. In the combination of claim 11 wherein said control valve means is employed to increase the flow rate in said active flow path attributable to said predetermined value by a magnitude between 1 and 5 percent of the active flow rate.

13. In the combination of claim 6 and further including means cooperating with said actuating means for preselectively varying said measured period of time; whereby the increased flow rate in said active flow path attributable to said predetermined volume of fluid can be varied.

14. In the combination of claim 13 wherein said last named means is employed to increase the flow rate in said active flow path attributable to said predetermined valve by a magnitude between 1 and 5 percent of the active flow rate.

15. In the combination of claim 2 wherein said injection means comprises fluid displacing means operable within said storage means for displacing fluid out of said storage means; and further including selectively operable actuating means for operating said fluid displacing means.

16. In the combination of claim 15 and further including an actuating bypass fluid circuit communicating at one end thereof with said storage means in operative relationship to said fluid displacing means and selectively communicable at its other end thereof to said downstream side of said active flow path.

17. In the combination of claim 16 wherein said other end of said actuating bypass fluid circuit is selectively communicable with said downstream side of said active flow path by being selectively connectable to said first fluid path at a point intermediate said storage means and said active flow path.

18. A method of proving a flow measuring device situated in an active flow path and capable of providing an output signal indicative of the rate of flow of fluid therethrough; said method comprising the steps of:

detecting the output signal of said flow measuring device over a known period of time while said fluid in said active flow path is flowing through said flow measuring device to provide a first value representative of output signals per unit of time for mainstream flow;

adding a predetermined volume of fluid to said flow path on the upstream side of said flow measuring device during a measured time interval;

detecting the output signal of said flow measuring device over said measured period of time to provide a second value representative of output signals per measured period of time for mainstream flow plus additional flow;

and further including the step of: converting said first value representative of output signals per measured period of time for mainstream flow.

19. The method of claim 18 and further including the steps of:

subtracting said third value from said second value to determine a factor representative of the number of output signals produced by said flow measuring device attributable to said predetermined volume; and multiplying said factor by said third value to determine the active flow rate per unit time through said flow measuring device.

* * * * *